US012714962B2

(12) United States Patent
Junginger et al.

(10) Patent No.: US 12,714,962 B2
(45) Date of Patent: Aug. 25, 2026

(54) METHOD FOR CALCULATING FILTER LOAD ESTIMATION, SYSTEM FOR CLEANING ENVIRONMENTAL AIR, AND VEHICLE COMPRISING SAME

(71) Applicant: MANN+HUMMEL Ventures Pte. Ltd., Singapore (SG)

(72) Inventors: Bernd Junginger, Stuttgart (DE); Eric Thebault, Ludwigsburg (DE); Alexander Wöber, Ludwigsburg (DE); Vincent Raimbault, Lyons (FR)

(73) Assignee: MANN+HUMMEL Ventures Pte. Ltd., Singapore (SG)

( * ) Notice: Subject to any disclaimer, the term of this patent is extended or adjusted under 35 U.S.C. 154(b) by 174 days.

(21) Appl. No.: 18/646,776

(22) Filed: Apr. 26, 2024

(65) Prior Publication Data

US 2024/0269593 A1 Aug. 15, 2024

Related U.S. Application Data

(63) Continuation of application No. PCT/EP2022/075125, filed on Sep. 9, 2022.

(30) Foreign Application Priority Data

Oct. 26, 2021 (EP) .................................... 21290070

(51) Int. Cl.
*B01D 46/00* (2022.01)
*B01D 46/46* (2006.01)
(Continued)

(52) U.S. Cl.
CPC ......... *B01D 46/0086* (2013.01); *B01D 46/46* (2013.01); *B60L 58/12* (2019.02);
(Continued)

(58) Field of Classification Search
CPC ................ B01D 46/0086; B01D 46/46; B01D 2279/40; B60L 58/12; B60L 58/26;
(Continued)

(56) References Cited

U.S. PATENT DOCUMENTS 7,923,141 B2 4/2011 Okuda et al.
2015/0333380 A1* 11/2015 Minamiura ........... B60L 3/0046 73/198
(Continued)

FOREIGN PATENT DOCUMENTS

DE 4345532 B4 5/2008
DE 102017008745 A1 3/2018
(Continued)

OTHER PUBLICATIONS

International Search Report in corresponding International Appln. No. PCT/EP2022/075125, Jan. 3, 2023, Rijswijk, Netherlands.

*Primary Examiner* — Alan D Hutchinson

(57) ABSTRACT

A method for calculating a filter load estimation in an electrical or hybrid vehicle and system for the same. The method comprising: obtaining, from a computer memory of the vehicle: charging status data representing a charging condition of a battery; charging power data representing a charging power being used for charging the battery. The method comprises obtaining an exterior air temperature; determining that the charging condition is that the battery is being charged; providing, with a fan, air flow through a heat radiator and a filter, wherein the filter is positioned in stream with the radiator; the method further comprising obtaining a battery charging parameter and calculating the filter load estimation based on the exterior temperature, the charging power and the battery charging parameter.

17 Claims, 8 Drawing Sheets

(51) Int. Cl.
*B60L 58/12* (2019.01)
*B60L 58/26* (2019.01)
*G07C 5/00* (2006.01)

(52) U.S. Cl.
CPC .............. *B60L 58/26* (2019.02); *G07C 5/006* (2013.01); *B01D 2279/40* (2013.01); *B60L 2240/36* (2013.01)

(58) Field of Classification Search
CPC ............... B60L 2240/36; G07C 5/006; H01M 2220/20; H01M 10/44; H01M 10/443; H01M 10/48; H01M 10/486; H01M 10/625; H01M 10/635; H01M 10/6568; B60K 11/02; B60K 2001/005; B60K 11/04
See application file for complete search history.

(56) References Cited

U.S. PATENT DOCUMENTS

| | | | | |
|---|---|---|---|---|
| 2018/0037093 | A1 | 2/2018 | Newman | |
| 2018/0134112 | A1 | 5/2018 | Seiferlein et al. | |
| 2019/0118140 | A1 * | 4/2019 | Fingland .................. | F01P 7/12 |
| 2019/0363411 | A1 | 11/2019 | Takeuchi et al. | |
| 2021/0276398 | A1 | 9/2021 | Kazari et al. | |

FOREIGN PATENT DOCUMENTS

| | | | |
|---|---|---|---|
| FR | 3076491 | A1 | 7/2019 |
| IN | 201941022243 | A | 12/2020 |
| WO | 2004047962 | A1 | 6/2004 |

* cited by examiner

METHOD FOR CALCULATING FILTER LOAD ESTIMATION, SYSTEM FOR CLEANING ENVIRONMENTAL AIR, AND VEHICLE COMPRISING SAME

CROSS-REFERENCE TO RELATED APPLICATIONS

This application is a continuation application of International Application No. PCT/EP2022/075125 filed on Sep. 9, 2022, which claims the benefit of European Application No. 21290070.8 filed on Oct. 26, 2021, the entire disclosures of which are incorporated herein by reference for all purposes.

TECHNICAL FIELD

The present disclosure concerns a method and computer program product for calculating a filter load estimation in a vehicle. The disclosure also concerns a system for cleaning environmental air. Further a vehicle comprising the system is also envisaged.

BACKGROUND ART

Due to progressive urbanization, the problem exists that the ambient air can exceed limit values for particulate matter and/or gases such as ozone, NOx, CO many times over, especially in certain weather conditions (no rain, inversion, low wind speeds, no air exchange between altitudes), as a result of industrial waste gases, road traffic and private fireplaces.

The problem of traffic-related emissions has recently been exacerbated by calls for driving bans for certain groups of vehicles, especially diesel cars, in areas of particularly high air pollution due to their NOx and particular matter emissions.

Therefore, there persists the problem to provide for improved air cleaning.

SUMMARY

The present disclosure concerns a method for calculating a filter load estimation in a vehicle, for example, an electrical or hybrid vehicle. For example, the filter may be a particle filter and the filter load estimation may be a filter dust load estimation. The vehicle may include a heat radiator and a receptacle for receiving filter, both the radiator and the filter, when placed in the receptacle being in an airstream when air is flowing. The heat radiator may be for cooling coolant fluid, the coolant fluid for transporting heat from a battery to the heat radiator. The heat radiator and the filter may be included in an air cooling system, for example, a front-end air cooling system. The method may include obtaining, from a computer memory of the vehicle, charging status data representing a charging condition of the battery. The method may include obtaining, from a computer memory of the vehicle, charging power data representing a charging power being used for charging the battery. The method may include obtaining an exterior air temperature. The method may include determining from the battery charging status data that the charging condition is that the battery is being charged. The method may include providing, with a fan (e.g., an electric fan), air flow through the heat radiator and the filter, wherein the filter may be positioned in series, preferably in front of the radiator. The method may include obtaining a battery charging parameter (e.g., from the computer memory) and calculating the filter load estimation based on the exterior temperature, the charging power and the battery charging parameter. The filter load estimation may be named a battery based load estimation. The filter load estimation may be further calculated based on a fan parameter, such as fan speed, e.g., fan angular frequency in rpm or Hz. Alternatively, or in addition, the fan speed may also be a pre-determined nominal speed and the filter load estimation may be calculated only when the fan is operating in the pre-determined nominal speed.

The present disclosure also concerns a method for calculating a filter load estimation in a vehicle including an air cooling system, optionally a front-end air cooling system, the air cooling system including a heat radiator and a filter in an airstream when air is flowing, the heat radiator for cooling coolant fluid, the coolant fluid for transporting heat from a part of the vehicle (e.g., from the internal combustion or fuel cell engine) to the heat radiator. The method may include obtaining from a computer memory of the vehicle cooling fluid temperature data representing the cooling fluid temperature. The method may include obtaining, (e.g., from a computer memory of the vehicle) an exterior air temperature. The method may include determining that the vehicle is not moving (e.g., the engine is off or working in stand-by). The method may include providing, with a fan, air flow through the heat radiator and the filter, wherein the filter is positioned in series of the radiator. The method may include determining that the fan is operating, and may further include acquiring the fan speed. The method may include based on the cooling fluid temperature, the charging power, and the exterior temperature calculating (e.g., with a microprocessor) the filter load estimation. The filter load estimation is also named a cooling based load estimation. The filter load estimation may be further calculated based on a fan parameter, such as fan speed, e.g., fan angular frequency in rpm or Hz. Alternatively, or in addition, the fan speed may also be a pre-determined nominal speed and the filter load estimation may be calculated only when the fan is operating in the pre-determined nominal speed.

The present disclosure also concerns a system for cleaning (e.g., reducing dust in) environmental air. The system may include a receptable configured to receive a filter, so that the filter when installed in the receptacle the filter is in series with a heat radiator of a vehicle in an airstream when air is flowing. The heat radiator for cooling coolant fluid and the coolant fluid for transporting heat from a part of the vehicle to be cooled (e.g., battery of the vehicle) to the heat radiator. The system may further include a computer memory storing instructions to cause the microprocessor to carry out the method of any of the embodiments described in the present disclosure. The system may include the filter, which is replaceable.

The present disclosure also concerns a vehicle including the system of any of the embodiments described in the present disclosure.

The present disclosure also concerns a computer program product including instructions which, when the program is executed by a microprocessor, causes the microprocessor to perform the method of any of the embodiments described in the present disclosure.

BRIEF DESCRIPTION OF DRAWINGS

Drawings show schematic and non-limiting examples to assist in explaining the disclosure, wherein:

FIG. 6 shows a flow chart of part of method 200 according to some embodiments showing access to a historical profile database 150;

DETAILED DESCRIPTION

Figure 1:
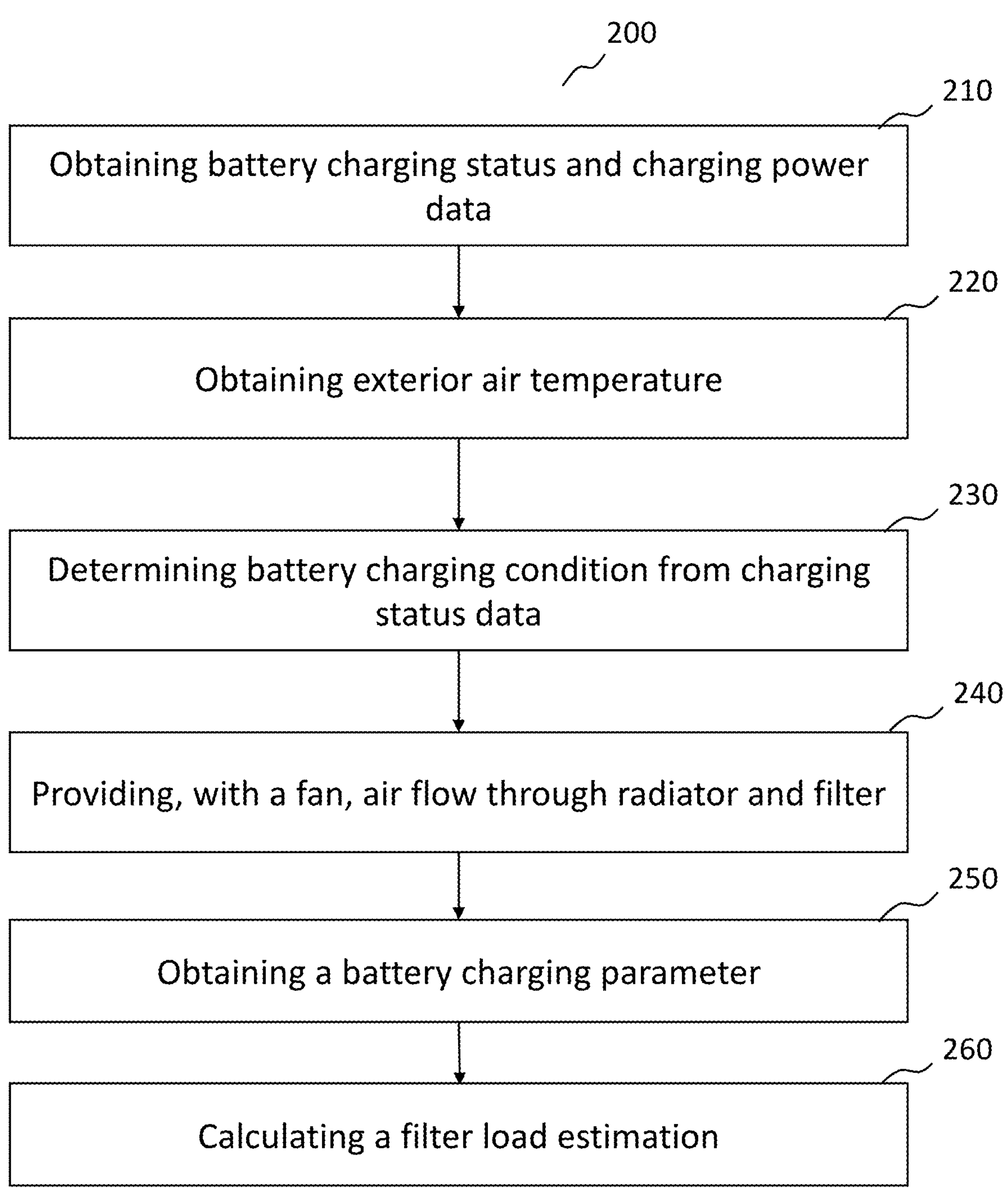
FIG. 1 shows a schematic flowchart of a method 200 for calculating a filter load estimation in accordance with various embodiments.

The system as described herein may be implemented in a vehicle. The receptacle (which may include the filter when installed in the receptacle), the heat radiator, and the fan are arranged, so that when the fan operates air flows through the heat radiator and may further flow through filter when the shutter is open. In a condition wherein the fan, the filter, and the heat radiator are in operation, it may be said that they are in a same airstream, or airstream connected. In some embodiments, the heat radiator may be downstream from the receptacle, such that filtered air flows through the heat radiator. In some embodiments, the fan may be downstream to the receptacle, in other embodiments, the fan may be upstream to the receptacle. In one example, the filter receptacle may be located upstream to the fan, and the fan may be located upstream to the heat radiator.

As used herein and in accordance with various embodiments the terms downstream and upstream are relate to airflow of the airstream, e.g., when air flows from an air intake of the vehicle to an air outlet, then the air intake is upstream from the outlet.

A shutter may be included upstream or downstream of the filter, when the filter is in the receptacle, preferably upstream. The shutter may be in the form of a roller shutter or a blind and, in a closed position, covers an inflow surface of the ambient air to a large extent, for example at least 70%, preferably completely. In some embodiments, the shutter may be arranged close to the filter, for example, within a distance of 1/10 of a larger diagonal filter dimension (e.g., the larger on of a filter height and a filter width for a rectangular filter, wherein the smallest dimension is the thickness). The shutter may be closed when the filter is not in use, e.g., it is necessary to protect the filter, or air filtering is not required thereby reducing unnecessary filter load. The shutter may be controlled electronically, e.g., the controlling circuit may issue a command for the shutter to close (e.g., a command to the shutter, optionally via the electronic control unit) or, in other examples, may operate an electromechanical switch.

The system may include a bypass. The bypass, in an open position, allows airflow to bypass the filter, i.e., not flow through the filter, and yet still flow through the radiator. For example, one end of the bypass may be upstream from the filter and the other end of the bypass may be downstream from the filter. In a closed position of the bypass, the airflow through the filter is maximized (for a given fan speed and vehicle speed). In the open position, then most of the airflow bypasses the filter, since the impedance from the filter is much higher and the impedance from the bypass is very low compared to the filter. The open position may include the meaning of fully open. In some embodiments, the bypass may be partially open, therefore controlling the air flow through the filter. A sufficiently large cooling air flow can be made available to the heat exchanger by means of the bypass under certain operating criteria. A switching temperature of the bypass may be designed in such a way that the system connected to the heat exchanger, such as the drive motor, is not thermally damaged under any circumstances. Furthermore, a loading condition of the filter element, i.e., the pressure drop across the element, and/or a driving speed of the vehicle may be used as a further switching criterion for the bypass. The bypass may be controlled electronically, e.g., the controlling circuit may issue a command for the bypass to close, open, or partially open (to the bypass, optionally via the ECU) or, in other examples, may operate an electromechanical switch. The fan and the bypass may be so arranged that air flow generated by the fan may pass through a bypass, when the bypass is (at least partially) open.

The system for cleaning air may include, the receptable and the heat radiator, and may further include the filter. The system may include the fan. The system may include the shutter and/or the bypass. The system may include the heat radiator, alternatively, the heat radiator may be part of the vehicle (in which the system is implemented in) but not part of the system. The vehicle may include the battery and the cooling circuit for the coolant fluid.

The vehicle may include the system. The vehicle may be a self driven motor-powered vehicle, for example having 2, 3, 4, or more wheels. Examples of the vehicle are passenger car, truck, buss, lorry, or a rail vehicle, for example a locomotive. The vehicle may include an air inlet opening in a front region, upstream from the system, for allowing air ingress and an air outlet, downstream from the system, for allowing air egress. The air inlet opening behind which the ambient air cleaning device is present may in particular be a cooling air inlet opening and may for example be covered by a radiator grille. For example, this may be at the same level as the front headlights with respect to the vertical axis of the vehicle, or may be located below or above them. The cross-sectional area of the air intake opening may be as large as possible so that the largest possible volume of air can be supplied. In some embodiments, the vehicle may be an electric vehicle or a hybrid (internal combustion engine and electrical) vehicle. In some embodiments, the vehicle may be an internal combustion engine vehicle (i.e., non-hybrid). For example, such battery of an ICE vehicle may have a relatively large capacity and may operate the fan for a long time (e.g., 1 h) without significant drain even if it is not being charge by an alternator. In some embodiments, the vehicle comprises an internal combustion engine and a cooling fluid temperature (from the hot side) may be used as representation of the engine temperature. In some embodiments, the vehicle comprises a fuel cell and a cooling fluid temperature (from the hot side) may be used as representation of the fuel cell temperature.

The fan may be an electrical fan. The speed range of fan influence is a speed range in which operation of the fan is able to alter the air flow (e.g., the volumetric air flow in $m^3$/s or the mass air flow in kg/s). In other words, out of the speed range of fan influence (within the speed range of non-fan influence) the air flow is substantially determined by the speed of the vehicle and is not alterable by the operation of the fan. Thus, not operating the fan out of the speed range of fan influence saves energy. Speed range of fan influence and the speed range of non-fan influence may be determined by measuring the airstream speed for different vehicle speed with the fan turned at this maximum nominal operation speed. Such measurement may be performed when there is no wind (i.e., external wind that would influence the measurements) and at a known temperature, e.g., T=30° C., without any adverse weather event. With these measurements, a threshold of fan influence may be determined. According to various embodiments, the speed range of fan influence may be from 0 km/h until the threshold of fan influence, and speed range of non-fan influence may be from speeds above the threshold of fan influence. The measurements may be performed for a specific car type and a specific fan type. The results of the measurements may be stored in a vehicle's memory (also named herein as computer memory of the vehicle) for later access, for example, the measurements may be stored in processed form as the pre-determined threshold of fan influence, the speed range of fan influence, or the speed range of non-fan influence. The pre-determined threshold of fan influence may be a single value, optionally including a hysteresis. Alternatively, the pre-determined threshold of fan influence may be different values, which depend on the direction of change of the vehicle speed (accelerating or decelerating) and/or may be offset by a hysteresis. The hysteresis may also be stored in the vehicle's memory for later access.

In some embodiments, the speed range of fan influence may be a threshold of fan influence. The fan may be actuated once the threshold is crossed, or the threshold and a hysteresis are crossed. Alternatively or in addition, the controlling circuit may be configured such that actuation does not occur within a period of time from a previous actuation, for example by implementing a disabled time, or a fixed rate.

As used herein and in accordance with various embodiments, the battery may be a main battery of a hybrid or an electric vehicle, meaning that the battery is used as main source of power for driving. In some embodiments, the battery may be a battery of an ICE vehicle (non-hybrid). For example, such battery of an ICE vehicle may have a relatively large capacity and may operate the fan for a long time (e.g., 1 h) without significant drain even if it is not being charge by an alternator.

Battery charging status data may represent a battery charging condition of the battery, for example, it may indicate that the battery is being charged, that the battery is being discharged, or that the battery is inactive. Example of a battery being inactive is not charging, and not discharging, for example, electrically disconnected.

Battery charge state level data may represent the battery charge level, for example, in a percentual, in a unit of energy (e.g., Joule, or Watt-hour). In the percentual representation, 0% may mean that the battery is empty and cannot substantially deliver any energy, and 100% may mean the maximum nominal capacity.

Charging power data may represent the charging power being used to charge the battery, for example a measurement of the power, a nominal value of the power, or of a range. Examples of the nominal value of power are 20 kW, 50 kW, 100 kW, 150 kW, 250 kW, or 350 kW. Examples of the range may be normal (e.g., <=20 kW), fast (e.g., between and including 22 kW and 100 kW), high power (e.g., >=150 kW).

Time period required to charge the battery may mean an actual time period to charge the battery until a known charge state, for example a time period to fully charge the battery. In some embodiments, the actual time period required to charge the battery may thus be used as a battery charging parameter. In other embodiments, the battery charging parameter may be a battery temperature.

The battery may be coupled to a heat exchange circuit for allowing ingress of coolant fluid and egress of coolant fluid. When the ingressing coolant fluid temperature is lower than the battery temperature, then the egressing coolant fluid is of higher temperature and carries at least some of the excessive heat thus cooling the battery. The coolant fluid may be cooled down by the heat radiator (which exchanges heat with the air that flows through it). The coolant flow may be generated by a pump. Alternatively, the coolant fluid may flow by phase change, capillary action, centrifugal force, and/or gravity, as is the case, e.g., in a heat pipe.

As used herein and in accordance with various embodiments, the battery may emit heat during discharging and during charging. Such heat is substantially generated by the internal resistance of the battery when current is flowing. The battery may comprise a temperature sensor, for example operable a communication bus of the vehicle so that the battery temperature data representing the battery temperature is assessable by the control circuit. Alternatively, or in addition, the battery temperature ($T_{BAT}$) may be inferred from the temperature of the coolant ($T_{CFH}$) (also named herein as hot side), for example, $T_{BAT}=T_{CFH}$ or a fraction thereof.

The temperature of the coolant may be measured on a hot side of a cooling circuit (e.g., a hot side of the radiator) which may be fluid temperature measured at a position between fluid leaving the part (e.g., battery or the engine) and arriving at the heat radiator. The temperature of the coolant may be a coolant fluid temperature leaving the battery.

Battery charging status data, Battery charge state level data, and/or Charging power data may be stored in the vehicle's memory.

The vehicle's memory may be distributed, e.g., in one or more of the control circuit memory, the ECU memory (if separated from the control circuit), a battery internal memory, a filter internal memory, depending on the implemented hardware configuration.

Data in vehicle's memory may be stored continuously or periodically. Data in vehicle's memory may be read continuously or periodically. A memory may be a memory physically encapsulated or monolithic to a microcontroller, or on a separate chip.

Data as used herein and in accordance with various embodiments, may be indicative of a value, for example, a measured value, a status, a counter, a time stamp, or others. Obtaining data and obtaining the value indicated by the data may be used herein interchangeably.

The controlling circuit may be an ECU, however the disclosure is not limited thereto. Alternatively, the controlling circuit may be a separate circuit which is operably connectable with the ECU. In another alternative, the controlling circuit may comprise a separate circuit and an ECU, the separate circuit operably connectable with the ECU. Similarly, the memory may be in one or distributed in more than of abovementioned devices. Operably connectable may include the meaning of connectable via a data communication bus such as CAN bus.

Different data formats or data packets may be used, for example, a battery status register may include one or more of: the battery charge state level data, the battery charging status data, charging power data, and the battery temperature data, or these may be separate in separate registers and/or accessed by separate data packets. For example, obtaining the battery charge state level data, the battery charging status data, the charging power data, and/or the battery temperature data may be carried out in a single step, for example the control circuit may enquire a database or a memory register to provide the respective data.

The controlling circuit may obtain weather data, air quality, and/or air temperature by receiving the data from sensors integrated in (e.g., fixed to) the vehicle, for example upstream of the filter, one or more of the following may be measured: air temperature, air quality data. A rain sensor may also provide may provide rain information.

Air quality data may include one or more of PM10 concentration, PM2.5 concentration, PM1 concentration, relative humidity, VOC concentration, NOx concentration. In various embodiments, air quality data may include at least one particulate matter concentration is measured.

Alternatively or in addition to obtaining data from the sensors of the vehicle, said data (or part thereof) may be obtained from a weather database that is external to the vehicle (e.g., via wireless communication), for example from a cloud. Such weather database may be a weather database, e.g., as it is provided by weather service providers. The wireless communication may be provided by the cellular infrastructure (3G, 4G, 5G, 6G and above), or WIFI. The weather database may provide information such as data representing adverse weather event, and/or air quality data.

Adverse weather event as used herein and in accordance with various embodiments may mean at least one of: snow, rain, sandstorm, volcanic ash fall.

The filter may be a particle filter, for example, to filter out (not let pass thought) PM10 particles and above, PM2.5 particles and above, or PM1 particles and above. The filter may be a fine dust filter.

The filter has at least one filter element which may include at least one filter medium which may be folded into at least one filter bellows. The filter may include a plurality of fold stabilizing means which support the filter bellows and are present at a lateral distance of e.g., not more than 150 mm from one another, and for example at least 15 mm from one another, for example 70 mm. It may be provided that the filter medium has an intrinsic bending stiffness of at least 1 $Nm^2$, for example, at least 2 $Nm^2$. This refers to an intrinsic bending stiffness of the filter medium, i.e., in an unprocessed/unfolded state. The filter may comprise pleat stabilizing means. The system may comprise one water separating device.

The depth of the filter element in the longitudinal direction of the vehicle may be less than 150 mm, for example less than 110 mm. The depth is preferably not be less than 15 mm, since otherwise the usable filter area would be very low. In one embodiment of the application, the dimensions of an inflow surface of the ambient air purification device may be, for example, 45 cm (height)×65 cm (width) for a typical mid-size passenger car. Depending on the size of the vehicle, however, significant deviations from this are possible, so that a range of dimensions from 20 cm in width to 120 cm in width and 15 cm in height to 100 cm in height are possible in principle.

The filter medium of the filter element of the ambient air purification device may be a single-layer or multi-layer filter medium, which may be water-resistant. It may be a multi-layer medium comprising at least one drainage layer and/or one pre-separator layer. Alternatively or additionally, the filter medium may comprise or consist of glass fibres and/or plastic fibres, in particular polyester and/or polyethylene. Finally, it may also be provided that the filter medium has a porosity gradient in a thickness direction, preferably in such a way that a pore size decreases in the direction of airflow.

Depending on the design of the filter element (volume flow pressure loss characteristic), it can be achieved in conjunction with the fan that the fine dust emissions of the vehicle are completely compensated by the ambient air cleaning device, so that it is a zero-emission vehicle in terms of dust, e.g., in terms of PM10 or PM2.5. For a typical medium-class passenger car, the total particulate matter emission is about 25 mg/km.

The filter may include a filter frame, for example, at least partially circumferential frame in which the filter element (e.g., filter bellows) is accommodated. In an example, it may be provided that the frame has an L-shaped cross-sectional form, e.g., wherein one leg of the L-shaped cross-section of the frame engages behind the filter bellows of the filter element, and thus supports it counter to the effect of dynamic pressure. The filter may comprise two or more filter elements, and the filter elements may be arranged in (e.g., fixed to) a single filter frame, or alternatively, each filter element may be arranged in a separate frame element of a filter frame.

The filter element may in particular comprise or be a plastic-molded filter element, wherein the at least partially circumferential frame may be connected to the filter medium by a material-to-material bond. However, the invention is not limited to a material connection; as an alternative to the material connection of the filter medium to the frame, it may also be provided that the filter element is merely inserted into the frame, so that it is supported in a form-fitting manner on the rear leg of the L-profile.

The filter may be arranged (and arrangeable) into the receptacle. The receptable may be fixed to the vehicle and may corresponds to the frame of the filter, in which the filter is held, optionally by detachable fastening means, e.g., a clip connection. The receptacle may further be configured to function as a mounting shaft, into which the at least one filter element may be linearly inserted. This makes it easy to replace the filter element, for example from the upper side of a lock carrier of a front hood or from an underbody side which is easily accessible, for example, during servicing on a lifting platform.

In some embodiments, it may further be provided that the filter is arranged with respect to the heat exchanger in such a way that it covers no more than 75% of an incident flow surface of the heat exchanger, so that sufficient residual heat dissipation is possible even when the filter element is loaded. In order to achieve this, the filter element can be arranged offset from the heat exchanger about the vertical and/or transverse direction of the vehicle. The non-covered portion of the heat radiator may form the bypass which may be openable and closeable. In other embodiments, the bypass may be an openable/closeable air passage which is independent from the heat exchanger surface, and the filter and the heat exchanger may be apart from each other at a distance sufficiently large to allow flow of air through the heat exchanger when the bypass is open, and even when the filter is loaded.

While filter load may be measured using a pressure differential sensor (measuring a pressure difference upstream and downstream the filter), such sensors are costly. Thus, the present disclosure allows for measuring a filter load by the air cooling efficiency, e.g., by measuring a time for during cooling of an engine, or a time for charging a battery which requires cooling. Surprisingly, this method allows for measuring filter load even when the vehicle is not moving, e.g., at the relatively lower pressure differentials generated by the fan, lower as opposed as pressures obtained on a highway. Thus a pressure measurement may not be necessary.

An initial state of a filter may be a new filter, for example an unloaded filter. In some embodiments, the initial state of a filter may be a new filter which is electrostatically loaded. In other embodiments, the initial state of the filter may be a known state with a partial load.

The present disclosure concerns a method for calculating a filter load estimation in an electrical or hybrid vehicle. For example, the filter may be a particle filter and the filter load estimation may be a filter dust load estimation. The vehicle may include a heat radiator and a receptacle for receiving filter, both the radiator and the filter, when placed in the receptacle being in an airstream when air is flowing. The heat radiator may be for cooling coolant fluid, the coolant fluid for transporting heat from a battery to the heat radiator. The heat radiator and the filter may be included in an air cooling system, for example a front-end air cooling system. The method may include obtaining, from a computer memory of the vehicle, charging status data representing a charging condition of the battery. The method may include obtaining, from a computer memory of the vehicle, charging power data representing a charging power being used for charging the battery. The method may include obtaining an exterior air temperature. The method may include determining from the battery charging status data that the charging condition is that the battery is being charged. The method may include providing, with a fan (e.g., an electric fan), air flow through the heat radiator and the filter, wherein the filter is positioned in the receptacle, the receptacle may be, for example, upstream or downstream of the radiator. The method may include obtaining a battery charging parameter (e.g., from the computer memory) and calculating the filter load estimation based on the exterior temperature, the charging power and the battery charging parameter. The filter load estimation may be named a battery based load estimation. The filter load estimation may be further calculated based on a fan parameter, such as fan speed, e.g., fan angular frequency in rpm or Hz. Alternatively, or in addition, the fan speed may also be a pre-determined nominal speed and the filter load estimation may be calculated only when the fan is operating in the pre-determined nominal speed.

Various embodiments concern a method for calculating a filter load estimation in a vehicle including an air cooling system, for example a front-end air cooling system, the air cooling system including a heat radiator and a filter in an airstream when air is flowing, the heat radiator for cooling coolant fluid, the coolant fluid for transporting heat from a part of the vehicle (e.g., from the internal combustion, fuel cell engine, electric motors in the case of electric or hybrid vehicles, battery) to the heat radiator. The method may include obtaining, from a computer memory of the vehicle, cooling fluid temperature data representing the cooling fluid temperature. The method may include obtaining, (e.g., from a computer memory of the vehicle) an exterior air temperature. The method may include determining that the vehicle is not moving (e.g., the engine is off or working in stand-by). The method may include providing, with a fan, air flow through the heat radiator and the filter, wherein the filter is positioned in series of the radiator. The method may include determining that the fan is operating, and may further include acquiring the fan speed. The method may include based on the cooling fluid temperature, the charging power, and the exterior temperature calculating (e.g., with a microprocessor) the filter load estimation. The filter load estimation may also be named a cooling based load estimation. The filter load estimation may be further calculated based on a fan parameter, such as fan speed, e.g., fan angular frequency in rpm or Hz. Alternatively, or in addition, the fan speed may also be a pre-determined nominal speed and the filter load estimation may be calculated only when the fan is operating in the pre-determined nominal speed.

The method may include obtaining, (e.g., measuring such as counting with a counter), an actual time period required to for the cooling fluid temperature to reach a pre-determined temperature (also named herein as time to cool down). The time to cool down may be, for example a time until the fan stops operating. Alternatively or in addition, the method may include determining a cooling curve profile.

Calculating the filter load estimation may include, based on the exterior temperature and further based on the pre-determined temperature and/or the cooling curve profile, estimating a remaining reference cooling time. The remaining reference cooling time may be a reference time for a filter in an initial state (e. g., new or unloaded) or a known state. Determining the filter load estimation may be based on the remaining reference cooling time and the actual time period.

In some embodiments, the method may include providing, with a fan, air flow through the heat radiator and the filter, wherein the filter is positioned in stream with the radiator.

In some embodiments, the battery charging parameter may be a battery temperature. The method may include obtaining battery temperature data representing the battery temperature. The method may further include inputting the charging power, the exterior temperature, and the battery temperature, into a load estimator on a microprocessor and calculating (e.g., by the microprocessor) the filter load estimation. The filter load estimation may be further calculated for a determined fan speed.

Alternatively to using the battery temperature, a coolant temperature may be used. For example, the method may include obtaining coolant temperature data indicating a temperature of the coolant on the hot side and estimating the battery temperature from the coolant temperature. The method may further include inputting the charging power, the exterior temperature, and the temperature of the coolant, into a load estimator on a microprocessor and calculating (e.g., by the microprocessor) the filter load estimation. The filter load estimation may be further calculated for a determined fan speed.

Alternatively or in addition to the battery temperature, the battery charging parameter may be an actual time period required to charge the battery. The method may include determining that the fan is operating, e.g., as cooling is necessary because the charging of the battery is temperature and not supply power limited. The method may include obtaining, (e.g., measuring, e.g., counting by a counter), the actual time period required to fully charge the battery, and calculating (e.g., by the microprocessor) the filter load estimation based on the charging power, and the exterior temperature estimating a remaining battery reference charging time. The remaining battery reference charging time may be a reference time for a filter in an initial state (e.g., new and/or unloaded). The method may include determining the filter load estimation based on the remaining battery reference charging time and the actual time period. For example, determining the filter load estimation may include comparing the actual time period with reference data for filters of different loads (remaining battery reference charging time), for the fan speed and the exterior temperature.

According to various embodiments, the method may include estimating a particle mass to which the filter was exposed to. The estimating may be based on air quality data, wherein the air quality data represents particle mass concentration. Air quality data may be stored during the vehicle operation or movement for later computing. The computing the filter load estimation may be further based on a reference filter load profile.

According to various embodiments, the air quality data may represent the exterior air quality (e.g., PM2.5 concentration, or PM10 concentration) of the vehicle, during the current lifetime of the filter, namely from a time in which the filter was in a known initial state (e.g., unloaded and/or newly installed) to a last or current time of movement of the vehicle. The measurement may be during movement of the vehicle. Alternatively or in addition, the measurement may be during movement and during a stationary vehicle with fan working.

According to various embodiments, the method may further include obtaining a vehicle speed, comparing the vehicle speed to a pre-determined threshold of fan influence. The vehicle speed may be stored as vehicle speed data.

According to various embodiments, the method may include determining that a vehicle speed is within a speed range of non-fan influence and adjusting the air quality data to the vehicle speed. Adjusting the air quality data to the vehicle speed may include multiplying the air quality data by the vehicle speed and to a pre-determined vehicle speed to air flow conversion coefficient. Determining that a vehicle speed is within a speed range of non-fan influence may include determining that the vehicle speed is above the pre-determined threshold of fan influence. Determining that a vehicle speed is within a speed range of non-fan influence may be carried out at a first time.

According to various embodiments, the method may include determining that a vehicle speed is within a speed range of fan influence and adjusting the air quality data to the vehicle speed and to the fan speed. Adjusting the air quality data to the vehicle speed and to the fan speed may include multiplying the air quality data by the vehicle speed and to a pre-determined coefficient.

Determining that a vehicle speed is in a speed range of fan influence may include determining that the vehicle speed is below the pre-determined threshold of fan influence. Determining that a vehicle speed is in a speed range of fan influence may be carried out at a second time. Wherein first time and second time are used solely as label to distinguish the method steps in time and are not limiting the method to a certain sequence of events.

According to various embodiments, the method may include storing driving profile data including air quality data, and optionally other data types as described herein, into a historical profile database for the lifetime of the filter. For example, each datapoint stored in the historical profile database may include a timestamp and/or storing may be at fixed and known rate. Air quality may also be acquired at a later stage by using stored location (e.g., GPS, Beidou, Glonass, and/or Galileo coordinates), and accessing data from a weather database including air quality data per time and location. The method may further include retrieving the driving profile data for calculating the filter load estimation by the microprocessor. According to various embodiments, driving profile data may be recorded continuously or periodically.

According to various embodiments, driving profile data may include information on the shutter state. Alternatively, driving profile data may be stored only for when it is determined that the shutter state is open. Thereby memory capacity may be saved.

According to some embodiments, the microprocessor may be from a board computer, i.e., a computer on the vehicle such as the ECU. According to some embodiments, the microprocessor may be from a remote computer, such as a computer cloud. According to some embodiments, the microprocessor may be distributed and comprise a cloud microprocessor and a board computer, each processing different parts of the method.

According to various embodiments, the method may further include one or more of: (i) presenting the filter lifetime (or remaining life) as a percentual or progression bar on a display; (ii) determining that the filter lifetime or load has passed a pre-determined threshold smaller than 100%, optionally generating a maintenance alert; and (iii) determining that the filter has achieved an end of life (e.g., fully loaded), and optionally generating a maintenance alert.

As disclosed herein and in accordance with various embodiments, the filter load estimation may be represented as a load weight or percentual, a remaining capacity, a rest of useful life (RuL), or in another equivalent form.

The present disclosure concerns a system for cleaning environmental air, e.g., reducing dust in environmental air. The system may include a receptable configured to receive a filter, so that the filter when installed in the receptacle the filter is in series with a heat radiator of a vehicle in an airstream when air is flowing. The heat radiator for cooling coolant fluid and the coolant fluid for transporting heat from a part of the vehicle to be cooled (e.g., battery of the vehicle) to the heat radiator. The system may further include a computer memory storing instructions to cause the microprocessor to carry out the method of any of the embodiments described in the present disclosure. The system may include the filter, which is replaceable.

The present disclosure concerns a vehicle including the system of any of the embodiments described in the present disclosure.

The present disclosure concerns a computer program product including instructions which, when the program is executed by a microprocessor, causes the microprocessor to perform the method of any of the embodiments described in the present disclosure.

FIG. 1 shows a schematic flowchart of a method 200 for calculating a filter load estimation in accordance with various embodiments. The method includes obtaining 210, from a computer memory 122 of the vehicle: charging status data representing a charging condition of the battery 15; and/or charging power data representing a charging power being used for charging the battery 15. The method may further include obtaining 220 an exterior air temperature. The method 200 may further include determining 230 from the battery charging status data that the charging condition is that the battery is being charged. The method 200 may further include providing 240, with a fan, air flow through the heat radiator and the filter. The method 200 may include obtaining 250 a battery charging parameter and calculating 260 the filter load estimation based on the exterior temperature, the charging power and the battery charging parameter.

The method 200 is not limited to the sequence of the steps shown in the flowchart of FIG. 1, and other logical combinations are feasible. Also, further or less method steps may be included. As previously explained, the filter load estimation may be further calculated based on a fan parameter, such as fan speed, e.g., fan angular frequency in rpm or Hz. Alternatively, or in addition, the fan speed may also be a pre-determined nominal speed and the filter load estimation may be calculated only when the fan is operating in the pre-determined nominal speed.

The battery parameter may be a battery temperature and the calculation 260 may be performed based on the charging power, the exterior temperature, and the battery temperature, into a load estimator on a microprocessor and calculating the filter load estimation.

The battery parameter may be a temperature of the coolant and the calculation 260 may be performed based on the charging power, the exterior temperature, and the temperature of the coolant, into a load estimator on a microprocessor and calculating the filter load estimation. Since the temperature of the coolant is of the hot side, it can be assumed, during charging, that the battery temperature is equal to the temperature of the coolant, or equal to the temperature of the coolant multiplied by a pre-determined correction factor.

Figure 2:
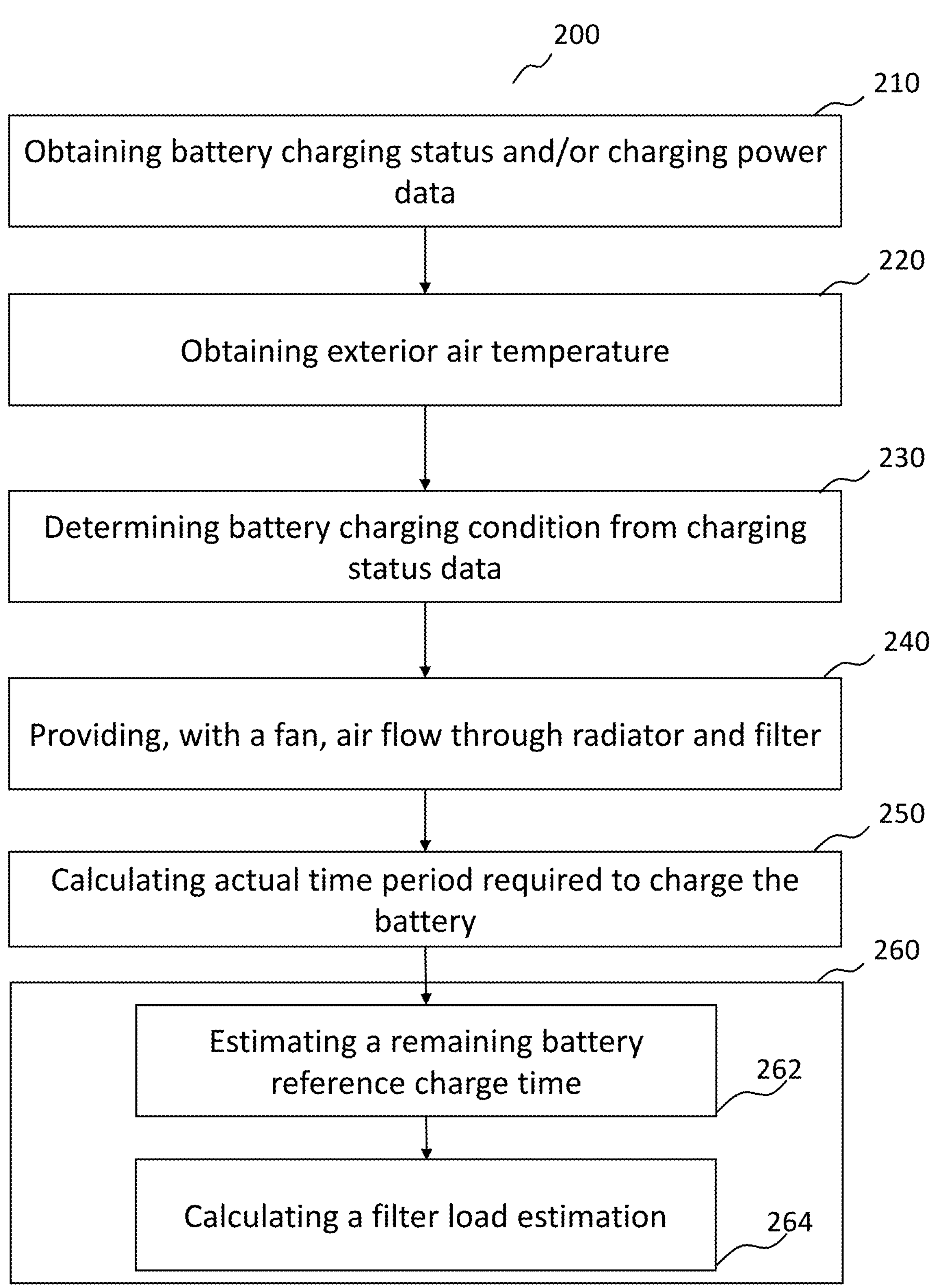
FIG. 2 shows another variation of the method 200 of FIG. 1.

FIG. 2 shows another variation of the method 200. The battery charging parameter may be an actual time period required to charge the battery. The method 200 may include obtaining 250, the actual time period required to charge the battery. For example, at a starting point record a first time stamp, and once the battery is fully charged, record a second timestamp, the actual time period required to charge the battery may then be calculated as the second time stamp minus the first time stamp, and/or a counter may be used to count lapsed time as the actual time period required to charge the battery. Calculating 260 the filter load estimation may include based on the charging power, and the exterior temperature estimating 262 a remaining battery reference charging time. The remaining battery reference charging time is a reference time for a filter in an initial state. The method may further include determining 264 the filter load estimation based on the remaining battery reference charging time and the actual time period. As previously explained, the filter load estimation may be further calculated based on a fan parameter, such as fan speed, e.g., fan angular frequency in rpm or Hz. Alternatively, or in addition, the fan speed may also be a pre-determined nominal speed and the filter load estimation may be calculated only when the fan is operating in the pre-determined nominal speed.

Figure 3:
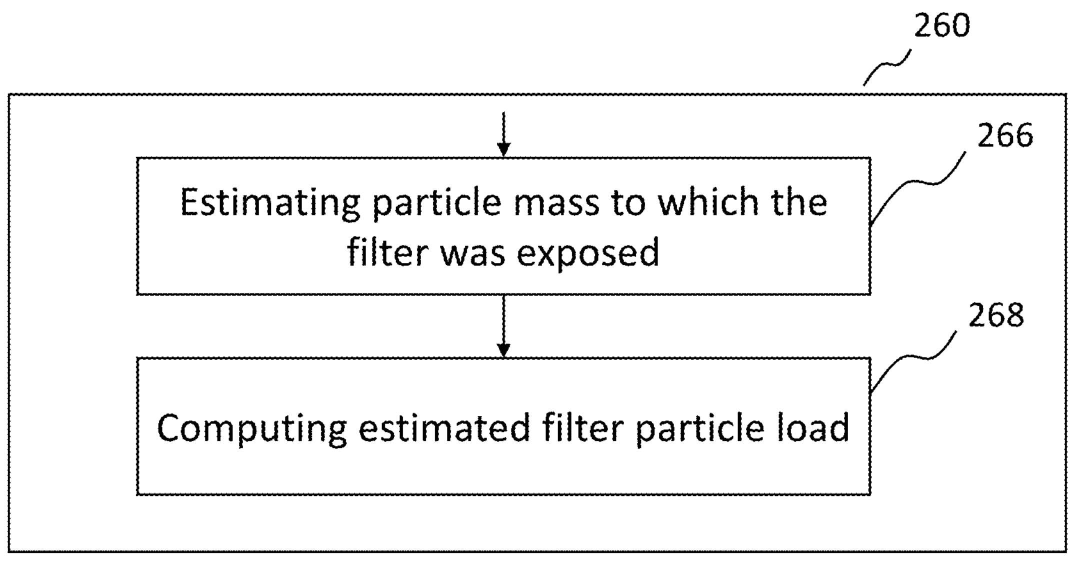
FIG. 3 shows another embodiment of step 260, which may be implemented alternatively or in addition to the steps shown in FIGS. 1 and 2.

FIG. 3 shows another embodiment of step 260, which may be used alternatively or in addition to the steps shown in FIGS. 1 and 2. The method 200 includes 266 estimating a particle mass to which the filter 102 was exposed to. The estimating may be based on air quality data 60 stored, and the air quality data 60 representing particle mass concentration. The computing 268 the filter load estimation may further be based on a reference filter load profile.

Figure 4:
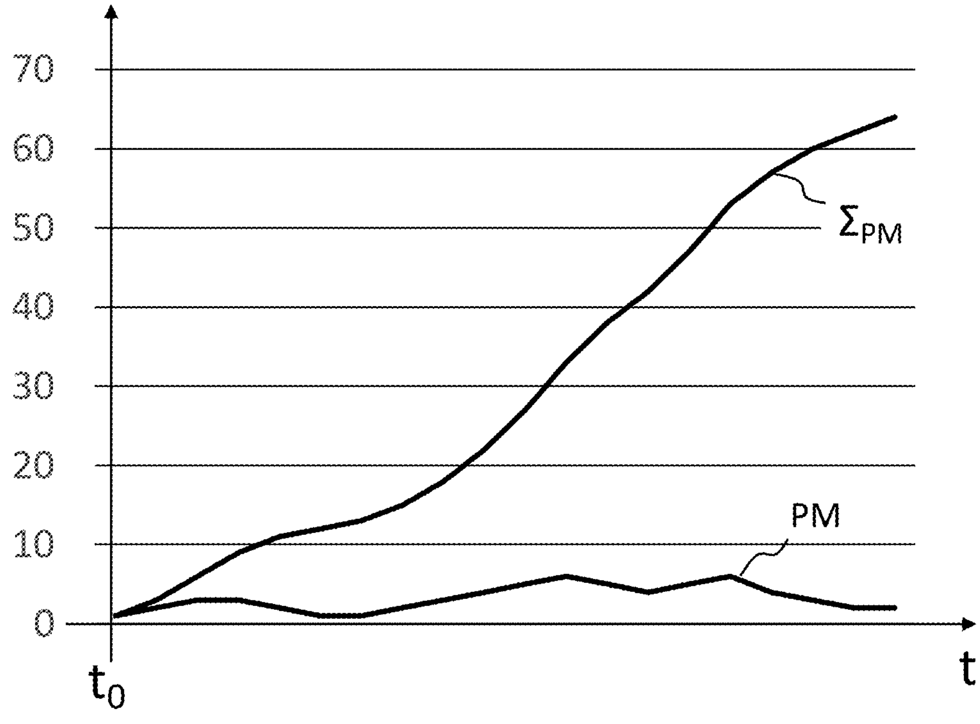
FIG. 4 shows a schematic example where the particle concentration is air recorded over time as obtained from the air quality data.

FIG. 4 shows a schematic example where the particle concentration (PM) is air recorded over time as obtained from the air quality data. PM recordal is only carried out when the filter is active, i.e., the shutter is open, and preferably, the bypass is closed. The PM value may be adjusted to the air flow, since higher airflow corresponds to higher filter loading. If the bypass is partially open, then the portion that is open may be considered to factor the air flow. The total accumulated particular matter (or simply named as dust) may then be calculated and is shown, by way of example, in $\Sigma_{PM}$. Once $\Sigma_{PM}$ achieves the full loading value, the method may determine that the filter is loaded (i.e., fully loaded) and needs to be replaced. Such full loading value may be a pre-determined value or may be determined by the $\Sigma_{PM}$ achieving a plateau. The vertical scale shown in the FIG. 4 is arbitrary and used for illustration purposes only.

The air quality data may represent the exterior air quality measured during movement of the vehicle, during the current lifetime of the filter, namely from a time in which the filter was in a known initial state to a last or current time of movement of the vehicle.

Figure 5:
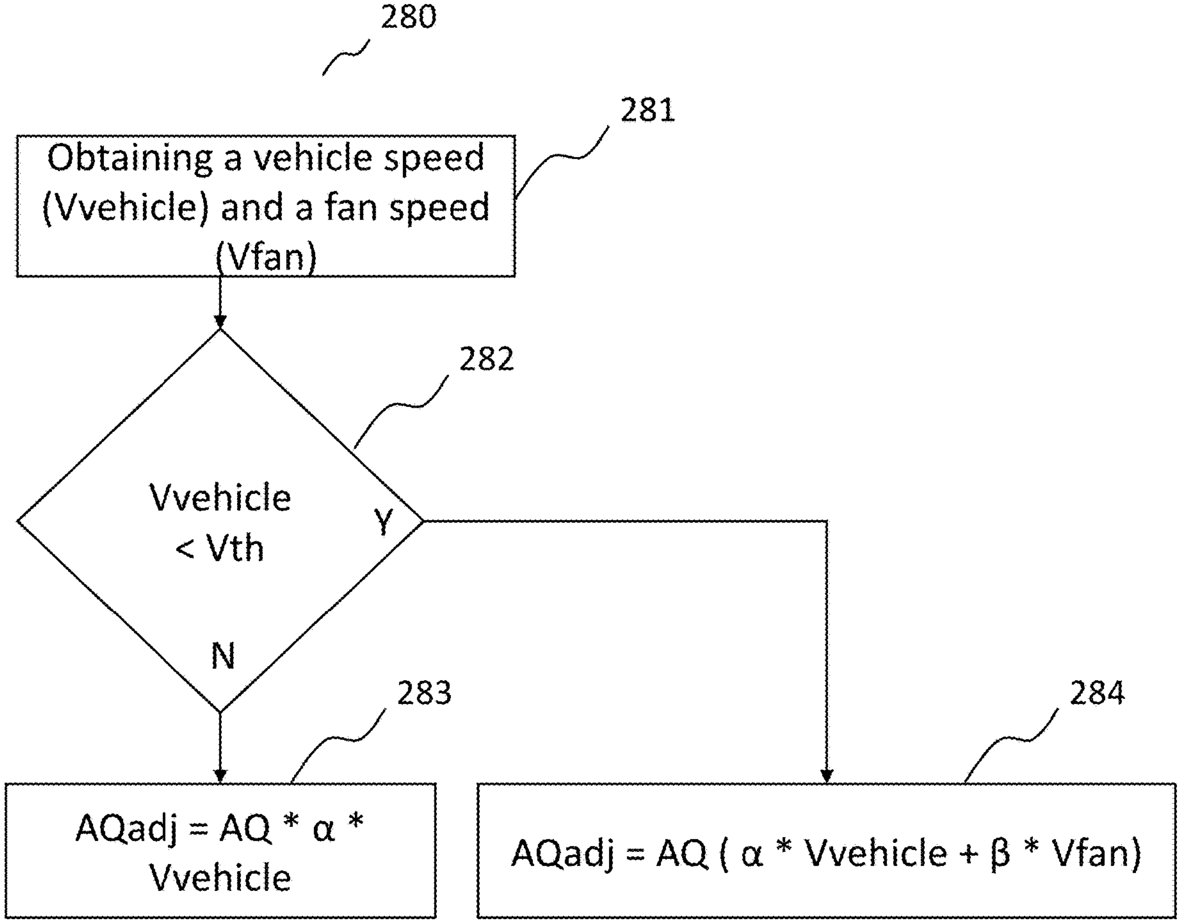
FIG. 5 shows a flow chart of a method 280 for adjusting the air quality data AQ to the air flow.

FIG. 5 shows a flow chart of a method 280 for adjusting the air quality data AQ to the air flow, the method comprising obtaining 281 a vehicle speed and a fan speed, and determining 282 that a vehicle speed is within a speed range of non-fan influence (branch “N”), and adjusting 283 the air quality data AQ to the vehicle speed, in other words, not using the fan speed for adjusting the air quality data AQ. For example, adjusting 283 the air quality data AQ to the vehicle speed may include multiplying the air quality data by the vehicle speed and optionally, to an air flow conversion coefficient α. The adjusted air quality data AQadj is independent from airflow since adjusting accounts for the airflow at the vehicle speed. In some embodiments an exact airflow or air flux may be calculated for the adjusting, while in other embodiments an empirically or experimentally pre-determined air flow conversion coefficient α may be sufficient.

The method may also include determining 282 that a vehicle speed is within a speed range of fan influence (branch “Y”), and the method may include adjusting 284 the air quality data AQ to the vehicle speed and to the fan speed, in other words, using the fan speed for adjusting the air quality data AQ. For example, adjusting 284 the air quality data AQ to the vehicle speed may include multiplying the air quality data by a sum of the vehicle speed and the fan speed. The sum may be weighted, for example, the vehicle speed may be multiplied by an air flow conversion coefficient α and/or the fan speed may be multiplied by an air flow conversion coefficient β. The adjusted air quality data AQadj is independent from airflow since adjusting accounts for the airflow at the vehicle speed and at the fan speed. In some embodiments an exact airflow or air flux may be calculated for the adjusting, while in other embodiments an empirically or experimentally pre-determined air flow conversion coefficient α may be sufficient.

The air quality AQ may be the particular matter concentration. Thus, the adjusted air quality may be multiplied by filter parameter(s) (e.g., filtration efficiency) to obtain the instant loading rate of the filter.

The skilled person in the art, based on the present disclosure, will understand that the above is a non-limiting example of how to obtain the instant loading rate and from there calculate the loading of the filter. Other formulas are possible, for example, a particle concentration, and a filtered air volume, which may be multiplied with each other and with a filtration efficiency for determining the filter loading. For example, the filtered air volume may be estimated based on: (i) the driving speed (when within the range of fan influence), (ii) the fan speed or the fan speed and the driving speed when within the range of non-fan influence, (iii) the fan speed only when the vehicle is not moving.

According to various embodiments an emission reduction (e.g., mg/km) may also be calculated based on the filtered air volume, the filtration efficiency, the particular matter concentration and the driving speed. For example: Emission $\text{reduction}_{\_PMx}$=Filtered Air Volume×Filtration Efficiency- $_{PMx}$×Particular Matter Concentration$_{PMx}$/Average driving speed. Wherein PMx may be, for example PM10, PM2.5, PM1, or other.

Figure 7:
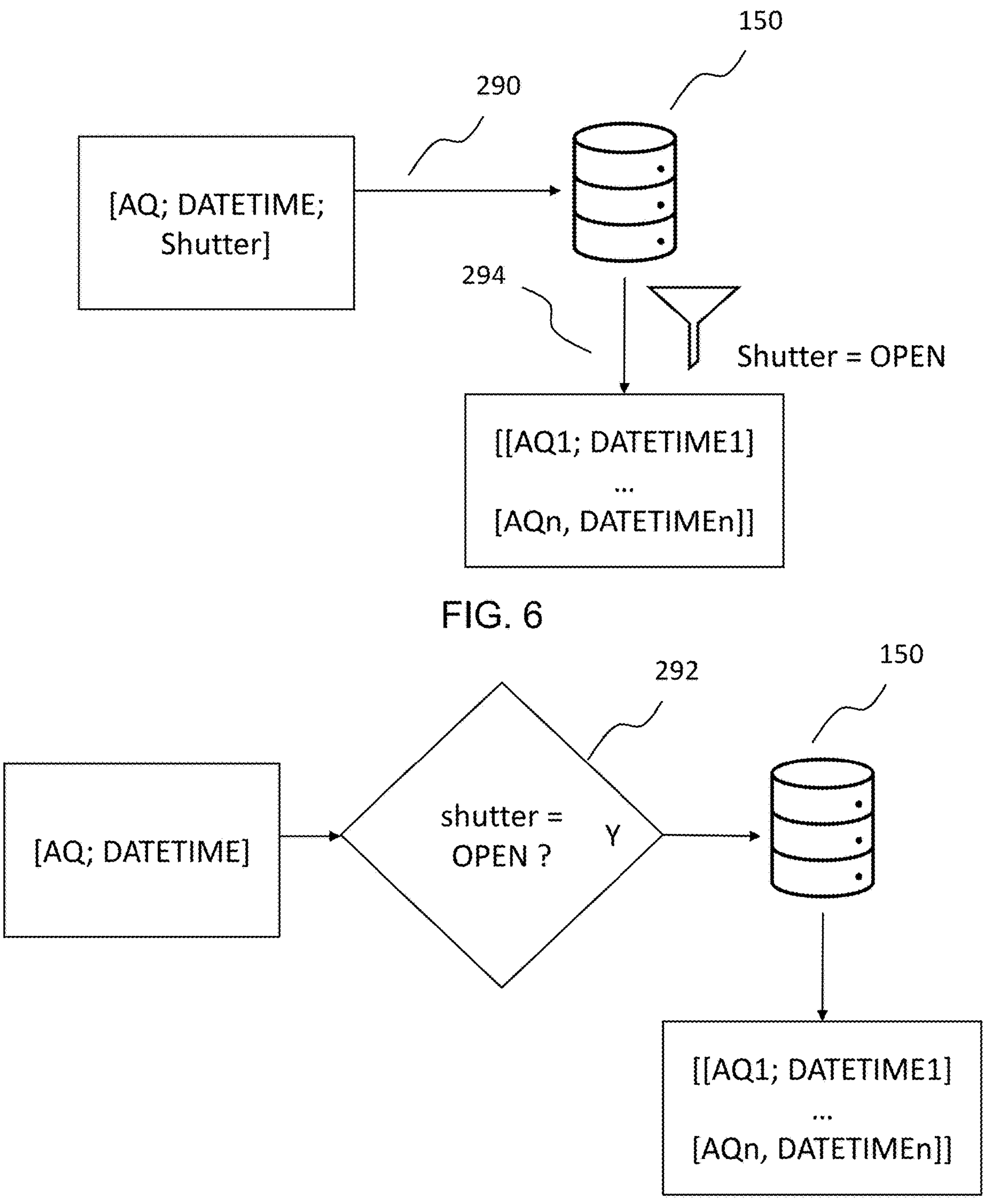
FIG. 7 shows an alternative to the flowchart of FIG. 6.

FIG. 6 shows a flow chart of part of method 200 according to some embodiments showing access to a historical profile database 150. The method 200 may further include storing 290 driving profile data for example in the form of [AQ; TIME; Shutter], wherein AQ is the air quality (obtained e.g., from sensors of the vehicle or from a database external to the vehicle), for example particular matter concentration; TIME is a time stamp (for example in epoch time format, or in ISO 8601, or in a representation wherein the origin is set with the installation of a new filter); and Shutter represents whether the shutter is open or closed. Further, any one or more of the following may also be stored as part of the driving profile data: a bypass value; the vehicle speed; the fan speed. The driving profile data may be stored in the historical profile database 150 for the lifetime of the filter 102. The method may further include retrieving 294 the driving profile data for calculating 260 the filter 102 load estimation by the microprocessor 124. A filtering may be implemented to remove the driving profile data in which the shutter is closed from the retrieve data, thus leaving only the driving profile data corresponding to the shutter being open. Alternatively, as shown in FIG. 7, only the profile data corresponding to the shutter being open may be stored in the database 150. In this alternative memory capacity and wearing may be saved since less data need to be stored, and the shutter information is also not required to be stored in the database 150. The database 150 may be stored in a remote computer such as a cloud, or stored in vehicle's memory, for example the memory of the control unit.

Figure 8:
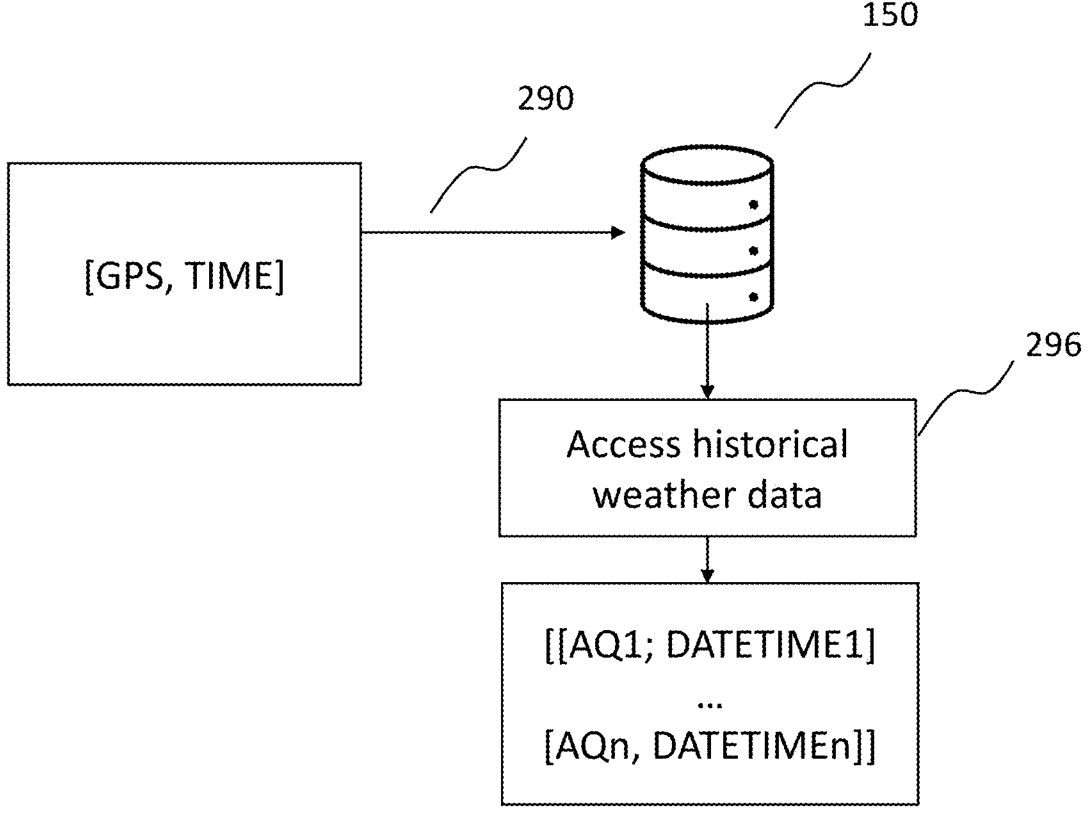
FIG. 8 shows a variation of the flowchart of FIG. 6, wherein the difference is that air quality data AQ is not stored as driving profile data in the historical profile database 150.

FIG. 8 shows a variation of the flowchart of FIG. 6, wherein the difference is that air quality data AQ is not stored as driving profile data in the historical profile database 150. When needed, the air quality data AQ may be accessed 296 by communicating with a weather database, e.g., from a remote server or a cloud, such as from a weather service provider. This variation requires less information to be stored in the database 150 and may also be implemented when air quality sensors are not available on the vehicle.

Figure 9:
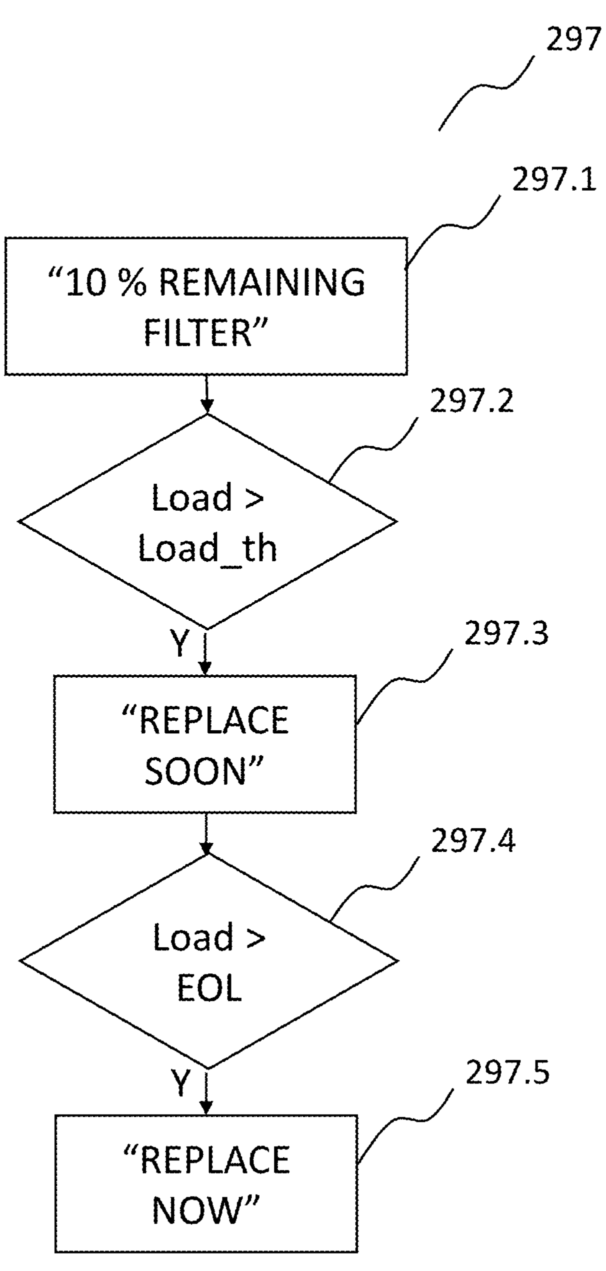
FIG. 9 shows a flowchart of a method 297 for processing filter loading data.

FIG. 9 shows a flowchart of a method 297 for processing filter loading data. The method 297 may include presenting 297.1 a filter lifetime on a display, for example as a percentual or progression bar. The method 297 may include determining 297.2 that the filter lifetime has passed a pre-determined load threshold (e.g., the pre-determined load threshold may be selected as a percentual smaller than 100%, e.g., from 70% to 95%, such as 90%), and optionally generating 297.3 a maintenance alert. The method may further include determining 297.4 that the filter 102 has achieved an end of life, and optionally generating 297.5 a maintenance alert.

Figures 10, 11:
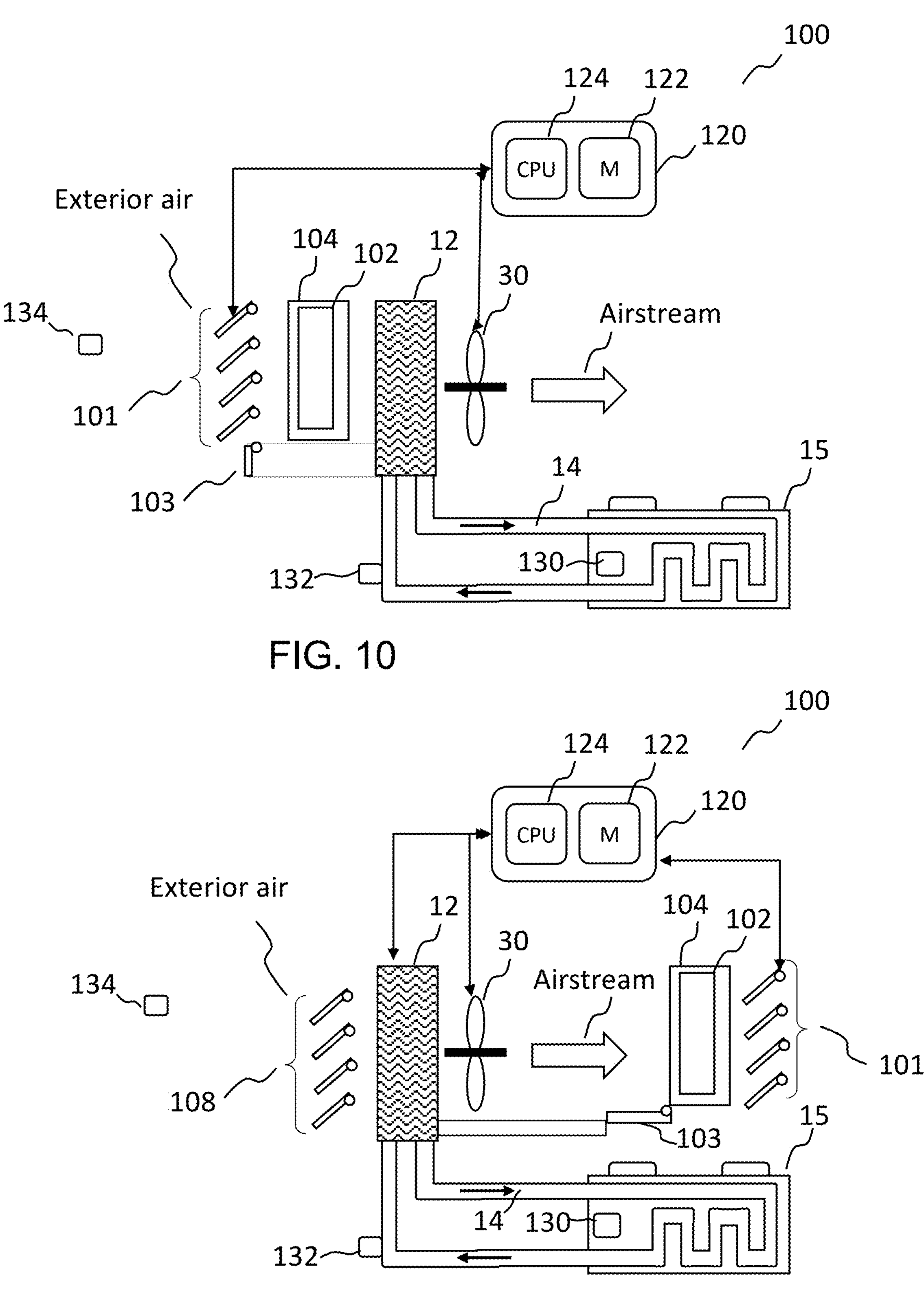
FIG. 10 shows a schematic of an exemplary system 100 for cleaning environmental air.
FIG. 11 shows a schematic of another exemplary system 100 for cleaning environmental air.

FIG. 10 shows a schematic of a system 100 for cleaning environmental air. The schematic is simplified for easier explanation of the disclosure. The system 100 may include a receptable 104 configured to receive a filter 102. As can be seen, when filter 102 is installed in the receptacle 104 it is instream with a heat radiator 12 of a vehicle 10 in an airstream when air is flowing through the filter. The heat radiator 12 being for cooling coolant fluid 14, the coolant fluid 14 for transporting heat from a part of the vehicle to be cooled (e.g., battery 15) of the vehicle 10 to the heat radiator 12. A fan 30 may be positioned in the air stream and generate air flow. The system may include a computer memory 122 storing instructions to cause the microprocessor 124 to carry out the method 200 of any of the previous claims. The system may further include the filter 102.

FIG. 11 shows a schematic of another embodiment of a system 100 for cleaning environmental air. The schematic is simplified for easier explanation of the disclosure. The system 100 may include a receptable 104 configured to receive a filter 102. As can be seen, when filter 102 is installed in the receptacle 104 it is in stream with a heat radiator 12 of a vehicle 10 in an airstream when air is flowing through the filter. The heat radiator 12 being for cooling coolant fluid 14, the coolant fluid 14 for transporting heat from a part of the vehicle to be cooled (e.g., battery 15) of the vehicle 10 to the heat radiator 12. A fan 30 may be positioned downstream from the radiator 12 and upstream from the filter 102, for generating air flow. The system may include a computer memory 122 storing instructions to cause the microprocessor 124 to carry out the method 200 of any of the previous claims. Further to the shutter 101, the system 100 of FIG. 11 may include an additional shutter 108. The system may further include the filter 102. The logic for controlling the additional shutter 108 may be the same as the shutter 101, except when the bypass 103 is open, in which case the additional shutter 108 is also open. The additional shutter may also be controlled by the control circuit 120.

FIGS. 10 and 11 schematically show battery temperature sensor 130 representing the battery temperature and is assessable by the control circuit. Alternatively, or in addition, the battery temperature (TBAT) may be inferred from the temperature of the coolant (TCFH) by coolant temperature sensor 132. Also shown schematically is exterior air temperature sensor 134 which may be integrated in (e.g., fixed to) the vehicle.

The invention claimed is:

1. A method for calculating a filter load estimation in a vehicle, the vehicle comprising:

an air cooling system comprising:

a heat radiator and a filter in an airstream when air is flowing through the filter, the heat radiator for cooling coolant fluid, the coolant fluid for transporting heat from a battery to the heat radiator;

a battery temperature sensor and/or a coolant temperature sensor; and an exterior air temperature sensor, wherein the sensors are operably in communication with a computer memory of the vehicle;

the method comprising:

obtaining, from the computer memory of the vehicle:

charging status data representing a charging condition of the battery; and charging power data representing a charging power being used for charging the battery;

obtaining an exterior air temperature from the exterior air temperature sensor;

determining from the charging status data that the charging condition of the battery is that the battery is being charged; and providing, with a fan, air flow through the heat radiator and the filter, wherein the method further comprises obtaining a battery charging parameter and calculating the filter load estimation based on the exterior air temperature, the charging power data and the battery charging parameter.

2. The method of claim 1, wherein the battery charging parameter is a battery temperature, wherein the method comprises:

obtaining battery temperature data representing the battery temperature, or obtaining coolant temperature data indicating a temperature of the coolant on a hot side and estimating the battery temperature from the temperature of the coolant; and inputting the charging power, the exterior temperature, and the battery temperature or the temperature of the coolant, into a load estimator on a microprocessor and calculating the filter load estimation.

3. The method of claim 1, wherein the battery charging parameter is an actual time period required to charge the battery, the method comprises:

obtaining, the actual time period required to charge the battery; and calculating the filter load estimation comprises:

based on the charging power and the exterior temperature, estimating a remaining battery reference charging time, wherein the remaining battery reference charging time is a reference time for a filter in an initial state; and determining the filter load estimation based on the remaining battery reference charging time and the actual time period.

4. The method of claim 3, further comprising:

storing driving profile data comprising air quality data into a historical profile database for a lifetime of the filter; and retrieving the driving profile data for calculating the filter load estimation by a microprocessor.

5. The method of claim 4, wherein the driving profile data comprises information on a shutter state.

6. The method of claim 4, wherein the driving profile data is stored only for when it is determined that a shutter state is open.

7. The method of claim 1, wherein the method comprises estimating a particle mass to which the filter was exposed to, which estimating is based on air quality data stored, the air quality data representing particle mass concentration, and wherein the calculating the filter load estimation is further based on a reference filter load profile.

8. The method of claim 7, wherein the air quality data represents an exterior air quality measured during movement of the vehicle, during a current lifetime of the filter, namely from a time in which the filter was in a known initial state to a last or current time of movement of the vehicle.

9. The method of claim 1, further comprising determining that a vehicle speed is within a speed range of non-fan influence, and adjusting air quality data to the vehicle speed, wherein adjusting the air quality data to the vehicle speed comprises multiplying the air quality data by the vehicle speed and to a pre-determined vehicle speed to air flow conversion coefficient.

10. The method of claim 1, further comprising determining that a vehicle speed is in a speed range of fan influence, and adjusting air quality data to the vehicle speed and to the fan speed.

11. The method of claim 10, wherein adjusting the air quality data to the vehicle speed and to the fan speed comprises multiplying the air quality data by a weighted sum of the vehicle speed and the fan speed.

12. The method of claim 1, wherein a microprocessor is from a board computer or wherein the microprocessor is from a remote computer, such as a computer cloud.

13. The method of claim 1, further comprising one or more of:

presenting a filter lifetime as a percentual or progression bar on a display;

determining that the filter lifetime has passed a predetermined threshold smaller than 100%, optionally generating a maintenance alert; and determining that the filter has achieved an end of life, optionally generating a maintenance alert.

14. The method of claim 1, wherein the vehicle is an electrical or hybrid vehicle.

15. A system for cleaning environmental air, comprising:

a receptable configured to receive a filter, so that the filter when installed in the receptacle is in series with a heat radiator of a vehicle in an airstream when air is flowing, the heat radiator for cooling coolant fluid, the coolant fluid for transporting heat from a battery of the vehicle to the heat radiator; and a computer memory storing instructions to cause a microprocessor to carry out the method of claim 1.

16. The system of claim 15, further comprising the filter.

17. A computer program product comprising instructions which, when the program is executed by a microprocessor, causes the microprocessor to perform the method of claim 1.

* * * * *